Feb. 11, 1947.　　E. F. SVERDRUP ET AL　　2,415,449
RECLAIMING RUBBER
Filed Feb. 26, 1944
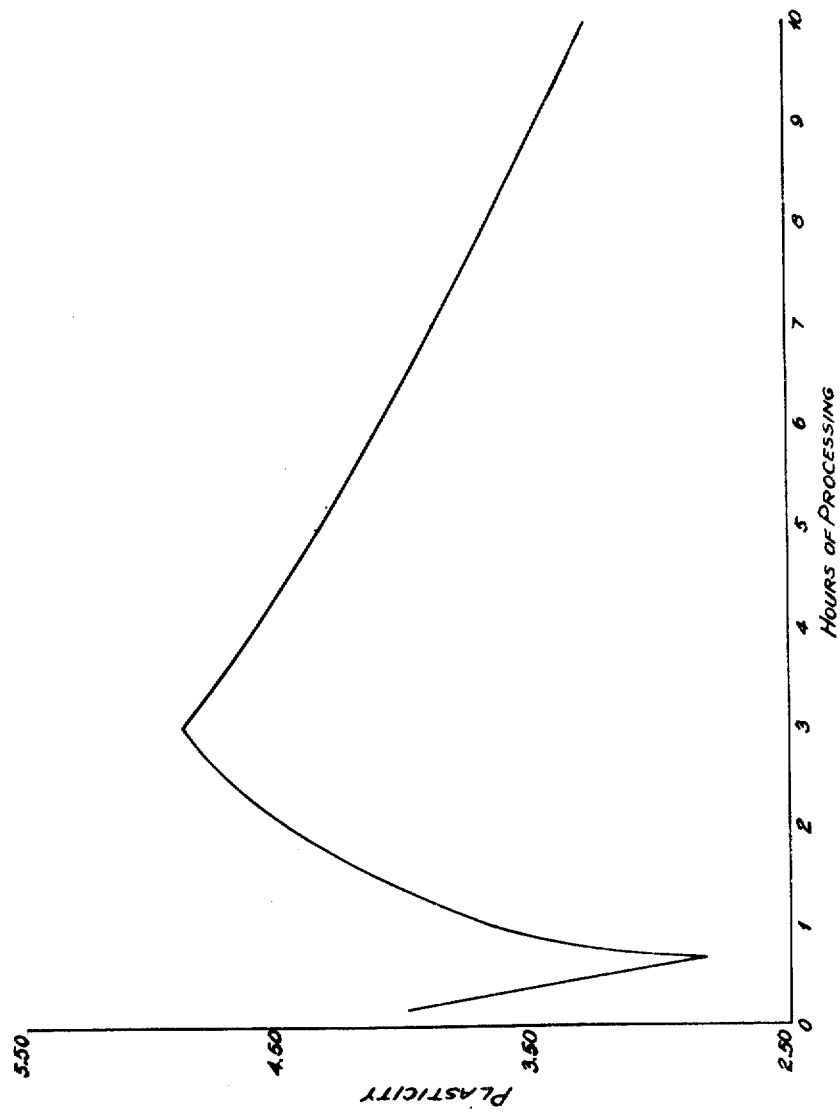
INVENTORS
Joseph Clifton Elgin
BY Edward F. Sverdrup
Blair, Curtis + Hayward
ATTORNEYS Patented Feb. 11, 1947

2,415,449

UNITED STATES PATENT OFFICE 2,415,449

RECLAIMING RUBBER

Edward F. Sverdrup, Buffalo, N. Y., and Joseph Clifton Elgin, Princeton, N. J., assignors to U. S. Rubber Reclaiming Company, Inc., Buffalo, N. Y., a corporation of New York Application February 26, 1944, Serial No. 524,064

29 Claims. (Cl. 260—720)

This invention relates to the manufacture of reclaimed rubber.

The reclaiming of rubber from scrap material, such as old tires, shoes, mechanical goods, etc., i. e., the conversion of vulcanized rubber into a plastic mass which can be remolded and revulcanized into new articles, is an old and well established industry. The purpose of the reclaiming procedures is to soften or to plasticize the rubber sufficiently that various compounding and revulcanizing ingredients may be incorporated in the recovered product in accordance with established manufacturing procedures, leading ultimately, after due vulcanization, to newly vulcanized articles of commerce.

Rubber reclaiming processes as known prior to our invention have generally utilized the swelling effect of solvents, the physical effect of softer plastics or of the so-called plasticizing agents, heat, mechanical working or a chemical desulfurization, or various combinations of these. Such processes have required long treatments and high expenditure of heat and/or power. Steam heating with or without water or other aqueous solutions is ordinarily at pressures about 100–200 lbs. per square inch which correspond to temperatures of about 340–390° F. These conditions are maintained in reclaiming plants for periods of time ranging from about 6 to 14 hours and plasticity increases gradually over this period until, the required plasticity having been attained, the treatment is terminated.

It is an object of the present invention to reduce the time and energy required for reclaiming rubber. Another object is to provide a particularly efficient and effective reclaiming process. Still another object is to produce an improved reclaimed rubber.

The present invention differs from this known process in developing an anomalous plasticity in a relatively brief initial period of treatment, and terminating the process while this anomalous plasticity remains.

The process of this invention is carried out by treating vulcanized rubber, which may or may not contain fibers or other inert materials or compounding ingredients. The rubber used may be natural or synthetic rubbers of the hydrocarbon chain type with or without substituents on the chain (e. g., chloroprene, neoprene, etc.).

The rubber, if not already in a thin or finely divided form, should be sufficiently comminuted either before or during the treatment so that the heat, and reclaiming agents, if used, may penetrate it rapidly. It is advantageously ground in the usual manner into small particles, and then mixed with the reclaiming agent in air before the heat treatment by which plasticity is developed; but it is also possible to combine these treatments by mixing at temperatures above the boiling point of water.

The reclaiming agent used, in general, is an oxygen carrier, i. e., one which is capable of reversible oxidation and/or reduction. Among such agents which have given particularly good results are aliphatic and aromatic mercaptans, aliphatic and aromatic monosulfides, aliphatic and aromatic disulfides, unsaturated hydrocarbons such as terpenes, especially terpinolene, unsaturated ketones, including phorone, "Antox," and various unsaturated and other nitrogen compounds and sulfur compounds.

The ground scrap with the reclaiming agent incorporated therein, if such agent is used, is treated at an elevated temperature under conditions such that oxygen is available in the rubber, from the reclaiming agent or from the atmosphere or otherwise.

We have found that, in this process when carried on in closed chambers or in a quiet mass, there occurs at first a very rapid anomalous increase in plasticity which, after reaching a maximum in a relatively short time, upon continued heating under ordinary conditions is reversed rather suddenly and followed by an almost equally rapid decrease in plasticity, so that it may be several times as long before the mass, in its subsequent normal behavior, regains a plasticity equal to that attained during the first brief anomalous period of the treatment. The reversion to a higher plasticity, however, is no part of my present invention and, in fact, under certain conditions (especially by driving or working additional oxygen into the rubber) I can bring about further slower increase in plasticity without reversion after the initial anomalous increase.

If at or near the time when this initial anomalous plasticity is reached the treatment is stopped, e. g., by cooling the product, this anomalous plasticity is retained; and the compound is satisfactorily stable so long as it remains at room temperature or ordinary temperatures of storage and handling. This treatment may be terminated whenever the degree of plasticity attained is sufficient for milling whether before or after the peak plasticity is reached. Subsequent milling, e. g., in accordance with standard rubber compounding procedures, tends to cause a further increase in plasticity.

Softening agents such as pine tar, coal tar, fatty acids, coumarone-indene resins, rosin, rosin oil, etc., may also be incorporated with the rubber and the reclaiming agent before or during the initial heating. To the extent that these contain oxygen carriers, such as terpinolene, etc., they may serve as chemical reclaiming agents as well as physical softeners.

It is an advantage of the invention that the reclaimed rubber resulting from my process is less degraded than other reclaims, due to the very short and mild treatment to which it has been subjected.

The most striking distinction of the present process from other processes for reclaiming rubber lies in this short period of treatment. The actual time will depend in each case primarily upon the nature of the rubber stock being treated and of such ingredients therein as pigments, anti-oxidants, accelerators, residual vulcanizing agents, etc., upon the temperature, upon the type, concentration and intimacy of distribution of the reclaiming agent in the rubber, and upon the intimacy of exposure to, and activity of, available oxygen. The higher the temperature of the treatment the higher the peak of plasticity reached in the anomalous period and the shorter the period of proper treatment; the higher the concentration with a given reclaiming agent and the more intimately it is distributed throughout the mass of rubber the higher will be the peak plasticity and the shorter the required time. Oxygen in some available form is essential to this process but only small amounts are required; an inadequate amount of oxygen can reduce the plasticity attainable during the initial anomalous period and may increase the time to maximum plasticity, but ordinarily sufficient oxygen will be taken up from the atmosphere without special control. Compounding ingredients included in the rubber stock under treatment may increase the time, the temperature and/or the amount of reclaiming agent required for a given increase in plasticity; or they may in some cases support the action of the reclaiming agents. Anti-oxidants in particular tend to counteract the reclaiming agent and should therefore be decomposed or their action neutralized, e. g., by use of larger amounts of reclaim agent, higher temperatures, more thorough mixing of the stock and reclaiming agent with air or other source of oxygen.

It is important that the heating up to treating temperature be as rapid and as uniform as possible for all parts of the reaction mass.

By use of volatile agents for the reclaiming, the treated rubber is quickly freed from such agent so that it is satisfactorily stable for normal storage and shipment.

Some of the agents most useful for this invention are also superior for use in the devulcanizing by longer processes, e. g., similar to known procedures, as is more particularly described and claimed in a copending application, Serial No. 618,573, filed September 25, 1945; but, so far as the present invention is concerned, it is essential to terminate the treatment, e. g., by chilling below about 200° F., and preferably to about room temperature, by removal of the reclaiming agent or otherwise, before the period of anomalous plasticity has passed.

The temperature of treatment should be above the boiling point of water, advantageously above about 300° F. (e. g., between 300 and 400° F.), and below the temperature of thermal decomposition of the rubber. The effect of a given temperature increase on the plasticity attained under given conditions increases as the temperature range is increased. At a temperature of about 340° F. the time to the peak plasticity will be from about 2 or 3 to about 100 minutes. The concentration of reclaiming agent in such case may be about 1–7% of the weight of scrap rubber. More may be used, but the advantage to be gained from a given increase of concentration of the reclaiming agent diminishes as the concentration increases. Oxygen may be supplied from the atmosphere during heating or may be absorbed by the rubber or reclaiming agent before heating, or it may be supplied by compounds, e. g., peroxides, per salts, etc., mixed with the mass of rubber, or a combination of these may be resorted to.

Treatment in a pressure vessel is an advantage in that many of the best reclaiming agents are volatile and are used to better advantage in a confined atmosphere. Moreover, an autoclave treatment provides a simple method of rapid and uniform heating of the porous mass of comminuted rubber, and by venting the steam the mass may be quickly chilled to the boiling point or—by use of a condenser or vacuum ejector—to any lower temperature by evaporation of condensate from the porous mass; and to some extent evaporation of the reclaiming agent will also serve to terminate the treatment. Normally, saturated steam is applied at the pressure required to give the desired temperature, taking into account residual air if present to provide oxygen.

Mixing should be sufficient in all cases to give substantially uniform distribution of the reclaiming agent; and it is an advantage to mix in the presence of air long enough to allow the mixture to take up oxygen required in the process. Beyond this, mere mixing is a disadvantage; but continued mixing in presence of air at a moderately elevated temperature, e. g., 100° to 300° F., reduces the time required in subsequent heating and ordinarily increases the maximum anomalous plasticity obtainable by such subsequent heating. At somewhat higher temperatures, e. g., above about 250° F., the plasticity develops during the mixing, but if such mixing at high temperature is carried on in air the increase of plasticity proceeds without reversion, and the rubber is subjected to severe oxidation. Treatment in a digester is both less expensive and productive of superior reclaim.

It is sometimes advantageous to terminate the treatment, e. g., by cooling, before the peak plasticity is reached. Thus the treatment may be designed to produce only a plasticity number of 3—4 (as determined by a Williams parallel plate plastometer), even though the number at peak plasticity, upon further continuance of the treatment, might go to 2.5 or less. Upon milling, this stock may be further softened by a continuance of the devulcanizing process. While it is preferable to terminate the treatment at or before the critical point at which the initial rapid increase of plasticity comes to an end, much of the advantage of the present invention can still be attained after the critical point has been passed even though there may have been some reversion to a less plastic condition, but not beyond a millable plasticity.

Heating may be by other means, e. g., radiant energy, especially infra red radiation; alternating stresses mechanical or electrical, especially high frequency alternating voltage, milling or mastication; treatment on hot rolls or in heated mixing apparatus, etc.

It is advantageous to use an oxidized form of the reversibly oxidizable compound (oxidation-reduction series) chosen as the oxygen-carrier reclaiming agent, or better yet, the mixture of rubber and reclaiming agent may be oxidized to some extent, as by mixing in air or even by standing in open air for a time, before the heating treatment.

If milling, mastication or other mechanical working is to be used as the means of heating, it is better to use at least a preliminary plasticizing by other means sufficient to convert the rubber into a workable mass, as direct heating is ordinarily more economical. The mechanical heating, however, has the advantage that it is developed internally and therefore simultaneously throughout the mass and it has the further advantage that it promotes thorough diffusion of the reclaiming agent into all parts of the rubber. Furthermore, in the final stages of such mechanical treatment, as plasticity increases, the internal heating decreases; and, therefore, with given cooling adapted to balance heat developed at a particular plasticity, the mass will tend to be cooled automatically as the plasticity exceeds the particular value.

Since most of the reclaiming agents used in accordance with this invention are volatile, it is advantageous to treat the mass of rubber in a confined space in which an appreciable vapor pressure of said agent is maintained. For this reason an autoclave or an enclosed masticating mil, e. g., of the Banbury or Werner-Pfleider types, will be preferable to treatment in open air. A further advantage of the confined treatment with volatile reclaiming agents is that by reduction of pressure and "sweeping" with other gas or vapor the reclaiming agent may be largely removed which aids in the termination of the treatment at the desired point.

Desirably, in certain instances, the mixture of rubber and reclaiming agent, with or without a softening agent, and/or other ingredients may be treated in accordance with this invention in the form of a thin film or other spread-out condition, but most advantageously it is in finely divided crumbs making a porous mass into which the heating medium, e. g., saturated steam, can readily penetrate.

The invention in its broader aspects is not only adapted for reclaiming vulcanized natural rubber but is also well adapted to the reclaiming of synthetic rubber, such, for example, as neoprene, Buna-S, Buna-N, etc. The term "rubber," as used herein, except where otherwise qualified, is accordingly to be understood to include both natural and artificial rubber. In the specific examples, however, the terms "inner tube scrap," and "tire tread scrap" refer to natural rubber scrap except where otherwise qualified.

The termination of the treatment at a time not substantially later than the beginning of reversion to a lower plasticity may be carried out in any of a variety of ways. For example, the steam in a digester may rapidly be blown off and the charge dumped into cold water, or the charge may be blown into cold water by the discharging steam. Alternatively, steam may be blown off and a vacuum applied to the digester in order to lower rapidly the temperature of residual water and rubber in the digester. If desired, a charge of crumbed rubber mix may be caused to move in a continuous system through heaters in such a manner that the time of movement through the system is the same as the desired time of processing, quenching or other cooling means being provided at the end of the continuous heaters. As a further means of terminating the process an inhibiting agent may be added when the desired plasticity is attained.

The treatment is preferably carried out at a temperature between 300° F. and 400° F., although there appears to be no top limit short of the temperature which will cause objectionable thermal decomposition of the rubber. At 300° F. the initial anomalous increase of plasticity may continue, with a given composition and conditions of treatment, for 3 hours whereas the maximum anomalous plasticity may occur at 5 minutes or earlier if the temperature of treatment is 400° F., with the given conditions of concentration of the devulcanization agent, presence of oxygen, intimacy of mixing, etc.

As indicated above the compounds which have thus far been found to develop the anomalous increase in plasticity according to the present invention are reversibly oxidizable and/or reducible compounds, i. e., the compounds of an oxidation reduction series, which are capable of oxidation by exposure to air or other source of available oxygen. The exact nature of the chemical reactions involved in the reclaiming treatment is not known, but tests with many different compounds have established the utility of this type of compounds as reclaiming agents for carrying out the invention. Among such compounds are the following: aromatic mercaptans, including particularly xylyl mercaptan in kerosene (RPA #3), thiophenol, benzyl mercaptan, alpha napthyl mercaptan (RPA #4); aromatic sulfides, including di-phenyl-sulfide; aromatic disulfides, including di-phenyl-disulfide, oxidized products of RPA #3, and benzyl disulfide; aliphatic mercaptans, including amyl mercaptan, isoamyl mercaptan, butyl mercaptan, dodecyl mercaptan, aliphatic sulfides, including commercial diamyl sulfide; aliphatic disulfides, including n-amyl disulfide; isoamyl disulfide, n-butyl disulfide; unsaturated hydrocarbons, including terpenes, especially terpinolene, and dicyclopentadiene; unsaturated ketones, including phorone and unsaturated long chain ketones especially of about eighteen carbon atoms; amino compounds and derivatives, including the condensation product of butyraldehyde and aniline (Antox), hydrazo benzene, azoxy benzene, azo benzene and pyrrole. Such compounds may be termed oxido-plasticization agents, the term "oxido-plasticization" being found on page 475 of The Chemistry and Technology of Rubber. Specific ones of these compounds and novel features involved in their use are covered in copending application, Ser. No. 618,573, filed September 25, 1945. Of these compounds we have found particularly advantageous the mercaptans and sulfides and their intermediate oxidation products, i. e., those compounds of the oxidation-reduction series derivable from the mercaptans or sulfides but short of the final, stable, oxidation products (such as sulfones, sulfonic acids, etc.).

The development of the anomalous plasticity according to the present invention is a function of temperature and the concentration of the reclaiming agent, and depends also on the particular reclaiming agent chosen. Even with no reclaiming agent an anomalous increase in plasticity is obtainable in accordance with the present invention. With saturated steam at 100 lbs./sq. in. and no reclaiming agent the increase in plasticity is slight and the maximum plasticity attained in this stage is still too high for a satisfactory reclaim; but with 200 lbs./sq. in. steam pressure a maximum in plasticity of 3.9 plasticity number Williams' parallel plate plastometer was attained after 20 minutes heating in the digester. This product is a useful reclaim.

At any given temperature and with any given reclaiming agent, the time required to produce a given increase in plasticity is decreased and the maximum anomalous plasticity is increased as the concentration of the reclaiming agent is increased. Likewise with any given concentration of a given reclaiming agent the time for a given increase of plasticity decreases and the maximum anomalous plasticity increases as the temperature is increased.

Although there are given below certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

There have been plotted plasticity numbers of a reclaimed rubber produced by my invention, and tensile strengths in pounds per square inch, and percent elongation after press cure of such reclaim with 6% sulfur for 22 minutes at 40 pounds per square inch (gauge) steam pressure, for successive batches treated for various periods of time in open steam of 100 pounds per square inch gauge (without flushing of the autoclave, i. e., with retention of air), ranging from 10 minutes to 10 hours.

Plasticity was determined by a Williams parallel plate plastometer at 70° C. Tensile strength and elongation, after press cure with 6% sulfur for 22 minutes at 40 pounds per square inch gauge steam were measured on a standard Scott rubber tester.

The plasticity of the vulcanized rubber before treatment was so low as to be below the range of the plastometer. In the drawing the plasticity curve for the successive batches after treatment is shown, and it will be seen that at 10 minutes the plasticity number was already down to about 4 and that it decreased sharply from this point to 2.85 at the end of 40 minutes. Ten minutes later it had risen sharply and continued to rise thereafter. A test sample taken at the end of the three hour period showed a plasticity number of 4.88, a number much higher than at the end of the first ten minutes of treatment. Thereafter the plasticity number decreased steadily to the ten hour period, when it was still higher than at 40 minutes. During this same time, the tensile strength decreased. While the decrease from 10 to 40 minutes was only about 350 p. s. i., the decrease, from the time the plasticity curve began to rise up to the tenth hour, was over 500 p. s. i. Likewise, the percent elongation curve shows only a slight decrease from the 10 to the 40 minute batches, but it decreased considerably during the balance of anomalous plasticity period and then, surprisingly showed an increase during the following period of normal devulcanization. Thus, it is evident that by stopping treatment at or near the 40 minute period, a much higher tensile strength and elongation, as well as other desirable qualities, can be obtained than if the process is continued beyond that.

*Example 1*

380 parts by weight of red inner tube scrap ground to 30 mesh size were mixed thoroughly with 10 parts xylyl mercaptan, 17.4 parts kerosene and 20 parts water (the latter was added to reduce static charge accumulation during mixing). The resulting mixture was heated in layers about one inch in open pans at 338° F., exposed to steam in an autoclave for one hour. When dried and milled the product was a very soft reclaim of excellent quality.

*Example 2*

380 parts of red inner tube scrap ground to 30 mesh size were mixed thoroughly with 20 parts xylyl mercaptan, 35 parts kerosene and 20 parts water. The resulting mixture was heated, as in Example 1, in pans at 338° F. in open steam for 5 minutes. When dried and milled the product was a very soft reclaim of a good quality.

*Example 3*

380 parts of red inner tube scrap ground to 30 mesh size were thoroughly mixed with 10 parts xylyl mercaptan, 17.4 parts kerosene and 20 parts of water. The resulting mixture was heated in pans at 308° F. for 2½ hours. After drying and milling the product was a highly satisfactory reclaim.

*Example 4*

380 parts of red inner tube scrap ground to 30 mesh size were mixed thoroughly with 12.8 parts of thiophenol. The resulting mixture was heated in pans at 338° F. in open steam for 1 hour. When dried and milled the product was a very soft reclaim of good quality.

*Example 5*

380 parts of red inner tube scrap ground to 30 mesh size were mixed with 21.4 parts of phenyl sulfide. The resulting mixture was heated in pans at 338° F. in open steam for 1 hour. When dried and milled the product was a satisfactory reclaim.

*Example 6*

380 parts of red inner tube scrap ground to 30 mesh size were mixed with 23.8 parts of di-phenyl-disulfide and 109 parts of xylol (the latter was added as a solvent for the di-phenyl-disulfide). The resulting mixture was heated in pans at 338° F. in open steam for 20 minutes. When dried and milled the product was a very soft reclaim of good quality.

*Example 7*

380 parts of red inner tube scrap ground to 30 mesh size were mixed with 22.8 parts of benzyl disulfide and 200 parts xylol as a solvent for the benzyl disulfide. The resulting mixture was heated in pans at 338° F. in open steam for 1 hour. When dried and milled the product was a soft reclaim of good quality.

*Example 8*

380 parts of red inner tube scrap ground to 30 mesh size were mixed with 12 parts isoamyl mercaptan. The resulting mixture was heated in pans at 338° F. in open steam for 1 hour.

When dried and milled the product was a soft reclaim of good quality.

Example 9

380 parts of red inner tube scrap ground to 30 mesh size were mixed thoroughly with 10.4 parts butyl mercaptan. The resulting mixture was heated in pans at 338° F. in open steam for 1 hour. When dried and milled the product was a reclaim of good quality.

Example 10

380 parts of red inner tube scrap ground to 30 mesh size were mixed with 20 parts of commercial diamyl sulfide. The resulting mixture was heated in pans at 338° F. in open steam for 1 hour. When dried and milled the product was a very soft and plastic reclaimed rubber.

Example 11

380 parts of red inner tube scrap ground to 30 mesh size were mixed with 20 parts isoamyl disulfide. The resulting mixture was heated in pans at 338° F. in open steam for 1 hour. When dried and milled the resulting product was a very soft reclaim of excellent quality.

Example 12

380 parts of red inner tube scrap ground to 30 mesh size were mixed with 20 parts of n-amyl disulfide. The resulting mixture was heated in pans at 338° F. in open steam for 1 hour. When dried and milled the product was a soft reclaim of good quality.

Example 13

380 parts of red inner tube scrap ground to 30 mesh size were mixed with 10.4 parts of n-butyl disulfide. The resulting mixture was heated in pans at 338° F. in open steam for 1 hour. When dried and milled the product was a reclaim of good quality.

Example 14

380 parts of red inner tube scrap ground to 30 mesh size were mixed thoroughly with 20 parts terpinolene and 20 parts water (the latter was added to reduce static charge accumulation during mixing). The resulting mixture was heated in pans at 338° F. in open steam for 40 minutes. When dried and milled the product was a very soft reclaim of excellent quality.

Example 15

380 parts of red inner tube scrap ground to 30 mesh size were mixed with 20 parts of C18 unsaturated ketones. The resulting mixture was heated in pans at 338° F. in open steam for 1 hour. When dried and milled the product was a reclaim of good quality.

Example 16

380 parts of red inner tube scrap ground to 30 mesh size were mixed with 20 parts of phorone. The resulting mixture was heated in pans at 338° F. in open steam for 40 minutes. When dried and milled the product was a reclaim of good quality.

Example 17

380 parts of tire tread scrap ground to 24 mesh size were mixed with 10 parts of xylyl mercaptan. The resulting mixture was heated in pans at 338° F. in open steam for 40 minutes. When dried and milled the product was a reclaim of excellent quality.

Example 18

190 parts of Buna S tire tread scrap ground to 6 mesh size were mixed thoroughly with 7.3 parts xylyl mercaptan and 14.7 parts kerosene. The resulting mixture was heated in open steam at a temperature of 388° F. for five minutes. After the addition of 5% by weight of a coal tar softener (Nevoll), a highly satisfactory reclaimed product was obtained.

Example 19

190 parts of Buna S tire tread scrap ground to 6 mesh size were mixed thoroughly with 7.3 parts xylyl mercaptan and 14.7 parts kerosene. The resulting mixture was placed in an autoclave in air at 80 pounds per square inch pressure at 175° F. for six hours. Subsequently, the mixture was heated in open steam at a temperature of 388° F. for 2½ minutes. After the addition of 5% by weight of a coal tar softener (Nevoll), a very satisfactory reclaimed product was obtained.

Example 20

190 parts of Buna S tire tread scrap ground to 6 mesh size were mixed thoroughly with 20 parts of a butyraldehyde-aniline condensation product (Antox). The resulting mixture was heated in open steam at a temperature of 388° F. for 20 minutes. After the addition of 5% by weight of a coal tar softener (Nevoll), a very satisfactory reclaimed product was obtained.

Example 21

380 parts of red inner tube scrap ground to 30 mesh were introduced into a Banbury mixer with 20 parts of water and 10 parts xylyl mercaptan, dissolved in 17.4 parts of kerosene. The Banbury mixer used is one having clearance between the blades and the housing of about $\frac{1}{16}''-\frac{1}{32}''$. The mixer is then operated for three hours maintaining the mass, during this mixing, at a temperature of about 80° F. The resulting mixture is then transferred to an autoclave and subjected to 100 pounds steam pressure (338° F.) and attained a maximum plasticity (3.98 plasticity number) after 20 minutes. The resulting product, when dried and milled, was a soft reclaim of good quality.

Example 22

A mixture described in Example 21, treated in the same manner excepting that the mass, during mixing in the Banbury, was maintained at a temperature of 220° F. and in the subsequent autoclave treatment reached a maximum plasticity (2.71 plasticity number) after 25 minutes.

Example 23

A mixture the same as in Example 21 treated as set forth in that example, excepting that the temperature of the mass during the mixing in the Banbury was maintained at about 290° F., at the end of three hours the rubber was already sufficiently low for re-use as high quality reclaim. Upon subsequent treatment in the autoclave, the maximum plasticity (1.7 plasticity number) was attained after 40 minutes.

Example 24

Red inner tube scrap ground as in the foregoing examples is mixed with 3.62% its weight of a 12-carbon atom, saturated, branch chain mercaptan derived from petroleum in 6.38% of kerosene. The mixture is heated in an autoclave at 100 lbs. per square inch saturated steam (338° F.); after ten minutes heating the plasticity number is down to 2.42 and a maximum plasticity is reached at about 60 minutes (2.07 plasticity number). Lesser amounts of this mercaptan may be used if a stiffer product is required. Such reduction in proportion of the reagent increases the time to maximum plasticity, but in view of the high activity of the reagent it is not necessary to continue the heating to the maximum. Other high molecular mercaptans can be used in similar manner, and for ordinary work it is convenient to use commercial mixtures of such higher aliphatic compounds such as are derived from the natural oils, e. g., the so-called "lorol" mercaptans.

The term "conjugated diolefin polymer" is used in the appended claims to include both natural rubber and the vulcanizable synthetic rubbers formed by polymerizing one or more unsaturated compounds including at least one of the conjugated diolefins with or without other combining elements or groups, for example, copolymers of butadiene with styrene or with acrylic nitrile, etc.

We claim:

1. The process of reclaiming vulcanized conjugated diolefin polymer compositions which comprises heating vulcanized conjugated diolefin polymer composition in the presence of available oxygen, and terminating the treatment when an initial anomalously high plasticity has been attained before a normal slower increase of plasticity has substantially progressed.

2. The process of reclaiming vulcanized conjugated diolefin polymer compositions which comprises heating vulcanized conjugated diolefin polymer composition in the presence of available oxygen and an oxido-plasticization reclaiming agent, and terminating the treatment when an initial anomalous plasticity has been attained before a normal slower increase of plasticity has substantially progressed.

3. The process of reclaiming vulcanized conjugated diolefin polymer compositions which comprises heating comminuted vulcanized conjugated diolefin polymer composition in the presence of available oxygen and an oxido-plasticization reclaiming agent, and terminating the treatment when the plasticity of the composition is sufficient for milling but before the initial anomalous plasticity is fully developed and before a slower normal increase in plasticity has substantially progressed.

4. The process of reclaiming vulcanized conjugated diolefin polymer compositions which comprises heating comminuted vulcanized conjugated diolefin polymer composition in the presence of available oxygen and an oxido-plasticization reclaiming agent, and terminating the treatment when the plasticity of the composition is approximately at the maximum of its initial anomalous plasticity and before a slower normal increase in plasticity has substantially progressed.

5. The process of reclaiming vulcanized conjugated diolefin polymer compositions which comprises heating comminuted vulcanized conjugated diolefin polymer composition in the presence of available oxygen and an oxido-plasticization reclaiming agent, and terminating the treatment by chilling the mass during its period of initial anomalous plasticity before it has reverted to comparatively non-plastic condition.

6. The process of reclaiming vulcanized conjugated diolefin polymer compositions which comprises mixing vulcanized conjugated diolefin polymer composition with available oxygen and an oxido-plasticization reclaiming agent, subjecting the entire mixture to a rapid heating throughout to a temperature above about 220° F. but substantially below the temperature of destructive distillation of the polymer, maintaining such temperature until an initial anomalous plasticity occurs, and then, substantially before reversion and beginning of a slower increase of plasticity, cooling the entire mass throughout to a temperature below that at which normal plasticizing proceeds.

7. The process of reclaiming vulcanized conjugated diolefin polymer compositions which comprises mixing vulcanized conjugated diolefin polymer composition in thin pieces with an oxido-plasticization reclaiming agent, permeating the mixture with available oxygen, subjecting the mixture to a heating medium at a temperature above about 300° F. but substantially below the temperature of destructive distillation of the polymer, maintaining such temperature until an initial anomalous plasticity occurs, and then before a slower normal increase in plasticity has substantially progressed, cooling the entire mass throughout to a temperature below that at which said normal plasticizing proceeds.

8. The process of reclaiming vulcanized conjugated diolefin polymer compositions which comprises permeating a mass of vulcanized conjugated diolefin polymer composition with available oxygen, subjecting the mixture to a heating medium at a temperature above about 300° F. but substantially below the temperature of destructive distillation of the polymer, maintaining such temperature until an initial anomalous plasticity occurs, and then before a slower normal increase in plasticity has substantially progressed, cooling the entire mass throughout to a temperature below that at which said normal plasticizing proceeds.

9. The process of reclaiming vulcanized conjugated diolefin polymer compositions which comprises treating with steam at super-atmospheric pressure and air a porous mass of comminuted vulcanized composition until the composition has attained an initial anomalous plasticity suitable for compounding and molding, and cooling the treated conjugated diolefin polymer composition below about 200° F. before such plasticity has been substantially lost by reversion.

10. The process of reclaiming vulcanized conjugated diolefin polymer compositions which comprises treating with steam at super-atmospheric pressure and air a porous mixture of vulcanized conjugated diolefin polymer composition with an oxido-plasticization reclaiming agent, and cooling the treated composition below about 200° F., when the composition has attained an initial anomalous plasticity suitable for compounding and molding and before such plasticity has been substantially lost by reversion.

11. The process of reclaiming vulcanized conjugated diolefin polymer compositions which comprises mixing finely divided vulcanized conjugated diolefin polymer composition with a volatile oxido-plasticization reclaiming agent, treating such mixture in porous mass in a confined atmosphere saturated with said reclaiming agent, and, during the initial period of anomalous plasticity and before reversion of the composition to an objectionably low plasticity, changing the atmosphere about said mass so as to effect evaporation of said reclaiming agent.

12. The process of reclaiming vulcanized conjugated diolefin polymer compositions which comprises mixing vulcanized conjugated diolefin polymer composition with an oxido-plasticization reclaiming agent, heating the mixture in the presence of available oxygen until an initial anomalous plasticity is produced sufficient for milling the composition, thereafter, before the slower normal increase of plasticity has substantially progressed, subjecting the resulting composition to a milling operation with cooling of the mill adapted to balance approximately the heat developed by milling when the composition is at a desired plasticity beyond that of said first-named treatment, whereby as the plasticity increases the temperature will automatically decrease, and overtreatment is thereby avoided.

13. The process of reclaiming vulcanized conjugated diolefin polymer compositions which comprises mixing vulcanized conjugated diolefin polymer composition with an oxido-plasticization reclaiming agent, heating the mixture rapidly and uniformly by milling in the presence of available oxygen until an initial rapid increase in plasticity is produced, thereafter, before a slower normal plasticity increase has substantially progressed, cooling the mill sufficiently to balance approximately the heat developed by milling when the composition is at a plasticity beyond that developed by said first-named treatment but less than the maximum plasticity obtainable by heating with said reagent, whereby as the plasticity increases the temperature will automatically decrease, and overtreatment is avoided.

14. The process of reclaiming vulcanized conjugated diolefin polymer compositions which comprises heating vulcanized conjugated diolefin polymer composition, in the presence of an oxido-plasticization reclaiming agent and available oxygen, by exposure in thin layer to infra-red radiation, and terminating said treatment during the initial period of anomalous plasticity before a slower normal increase of plasticity has substantially progressed.

15. The process of reclaiming vulcanized conjugated diolefin polymer compositions which comprises comminuting vulcanized conjugated diolefin polymer composition, mixing it with an oxido-plasticization reclaiming agent, and subjecting the mass in the presence of available oxygen to alternating stresses adapted to produce internal heating, and terminating said treatment during the initial period of anomalous plasticity before a slower normal increase of plasticity has substantially progressed.

16. The process of reclaiming vulcanized conjugated diolefin polymer compositions which comprises incorporating in a mass of vulcanized conjugated diolefin polymer composition a mercaptan or intermediate oxidation product thereof, heating said mass rapidly throughout, and cooling the mass throughout when an initial anomalous plasticity is developed and before a slower normal increase of plasticity has substantially progressed.

17. The process of reclaiming vulcanized conjugated diolefin polymer compositions which comprises incorporating in a mass of vulcanized conjugated diolefin polymer composition a reversibly oxidizable organic sulfur compound, heating said mass rapidly through, and cooling the mass throughout when an initial anomalous plasticity is developed and before a slower normal increase of plasticity has substantially progressed.

18. The process of reclaiming vulcanized conjugated diolefin polymer compositions which comprises incorporating in a mass of vulcanized conjugated diolefin polymer composition a mercaptan, heating said mass rapidly throughout, and cooling the mass throughout when an initial anomalous plasticity is developed and before a slower normal increase of plasticity has substantially progressed.

19. The process of reclaiming vulcanized conjugated diolefin polymer compositions which comprises incorporating in a mass of vulcanized conjugated diolefin polymer composition an aryl mercaptan, heating said mass rapidly throughout, and cooling the mass throughout when an initial anomalous plasticity is developed and before a slower normal increase of plasticity has substantially progressed.

20. The process of reclaiming vulcanized conjugated diolefin polymer compositions which comprises incorporating in a mass of vulcanized conjugated diolefin polymer composition an organic sulfide or intermediate oxidation product thereof, heating said mass rapidly throughout, and cooling the mass throughout when an initial anomalous plasticity is developed and before a slower normal increase of plasticity has substantially progressed.

21. The process of reclaiming vulcanized conjugated diolefin polymer compositions which comprises incorporating in a mass of vulcanized conjugated diolefin polymer composition an organic sulfide, heating said mass rapidly throughout, and cooling the mass throughout when an initial anomalous plasticity is developed and before a slower normal increase of plasticity has substantially progressed.

22. The process of reclaiming vulcanized conjugated diolefin polymer compositions which comprises incorporating in a mass of vulcanized conjugated diolefin polymer composition an aliphatic mercaptan, heating said mass rapidly throughout, and cooling the mass throughout when an initial anomalous plasticity is developed and before a slower normal increase of plasticity has substantially progressed.

23. The process of reclaiming vulcanized conjugated diolefin polymer compositions which comprises incorporating in a mass of vulcanized conjugated diolefin polymer composition a higher aliphatic mercaptan, heating said mass rapidly throughout, and cooling the mass throughout when an initial anomalous plasticity is developed and before a slower normal increase of plasticity has substantially progressed.

24. The process of reclaiming vulcanized conjugated diolefin polymer compositions which comprises incorporating in a mass of vulcanized conjugated diolefin polymer composition an aryl sulfide, heating said mass rapidly throughout, and cooling the mass throughout when an initial anomalous plasticity is developed and before a slower normal increase of plasticity has substantially progressed.

25. The process of reclaiming vulcanized conjugated diolefin polymer compositions which comprises incorporating in a mass of vulcanized conjugated diolefin polymer composition xylyl mercaptan, heating said mass rapidly throughout, and cooling the mass throughout when an initial anomalous plasticity is developed and before a slower normal increase of plasticity has substantially progressed.

26. The process of reclaiming vulcanized conjugated diolefin polymer compositions which comprises incorporating in a mass of vulcanized conjugated diolefin polymer composition diphenyl sulfide, heating said mass rapidly throughout, and cooling the mass throughout when an initial anomalous plasticity is developed and before a slower normal increase of plasticity has substantially progressed.

27. The process of reclaiming vulcanized conjugated diolefin polymer compositions which comprises incorporating in a mass of vulcanized conjugated diolefin polymer composition dodecyl mercaptan, heating said mass rapidly throughout, and cooling the mass throughout when an initial anomalous plasticity is developed and before a slower normal increase of plasticity has substantially progressed.

28. The process of producing reclaimed conjugated diolefin polymer compositions of improved quality which comprises subjecting comminuted vulcanized conjugated diolefin polymer composition scrap to a thermal reclaiming treatment, and terminating the treatment in the lower portion of an initial dip in the plasticity-number curve.

29. The process of reclaiming vulcanized rubber or other conjugate diolefin polymer composition which comprises heating such vulcanized composition in comminuted form with a reclaiming agent in the presence of available oxygen, whereby to produce an initial dip in the plasticity-number curve which under continuance of ordinary conditions of reclaiming, would produce a sharp rise at the end of the dip followed by a gradual decline in the curve, the process being characterized by the step of terminating the treatment in the lower portion of said initial dip.

EDWARD F. SVERDRUP.
JOSEPH CLIFTON ELGIN.

REFERENCES CITED

The following references are of record in the file of this patent:

UNITED STATES PATENTS

| Number | Name | Date |
|---|---|---|
| 1,532,213 | Windelmann | Apr. 7, 1925 |
| 2,193,624 | Garvey | Mar. 12, 1940 |
| 2,273,506 | Bachle | Feb. 17, 1942 |
| 2,280,484 | Gumlich | Apr. 21, 1942 |
| 2,304,549 | Dasher | Dec. 8, 1942 |
| 2,333,810 | Neal et al. | Nov. 9, 1943 |
| 2,325,289 | Treves | July 27, 1943 |
| 2,211,592 | Castello | Aug. 13, 1940 |

OTHER REFERENCES

"Institute of the Rubber Industry, Trans.," pp. 82–85, 1944.

"Industrial and Engineering Chem.," vol. 36, pp. 1114–1116 incl., 1944.

---

Certificate of Correction

Patent No. 2,415,449.      February 11, 1947.

EDWARD F. SVERDRUP ET AL.

It is hereby certified that error appears in the printed specification of the above numbered patent requiring correction as follows: Column 16, line 25, for "82–85" read *182–185*; and that the said Letters Patent should be read with this correction therein that the same may conform to the record of the case in the Patent Office.

Signed and sealed this 13th day of May, A. D. 1947.

[SEAL]

LESLIE FRAZER,
*First Assistant Commissioner of Patents.* and before a slower normal increase of plasticity has substantially progressed.

27. The process of reclaiming vulcanized conjugated diolefin polymer compositions which comprises incorporating in a mass of vulcanized conjugated diolefin polymer composition dodecyl mercaptan, heating said mass rapidly throughout, and cooling the mass throughout when an initial anomalous plasticity is developed and before a slower normal increase of plasticity has substantially progressed.

28. The process of producing reclaimed conjugated diolefin polymer compositions of improved quality which comprises subjecting comminuted vulcanized conjugated diolefin polymer composition scrap to a thermal reclaiming treatment, and terminating the treatment in the lower portion of an initial dip in the plasticity-number curve.

29. The process of reclaiming vulcanized rubber or other conjugate diolefin polymer composition which comprises heating such vulcanized composition in comminuted form with a reclaiming agent in the presence of available oxygen, whereby to produce an initial dip in the plasticity-number curve which under continuance of ordinary conditions of reclaiming, would produce a sharp rise at the end of the dip followed by a gradual decline in the curve, the process being characterized by the step of terminating the treatment in the lower portion of said initial dip.

EDWARD F. SVERDRUP.
JOSEPH CLIFTON ELGIN.

REFERENCES CITED

The following references are of record in the file of this patent:

UNITED STATES PATENTS

| Number | Name | Date |
|---|---|---|
| 1,532,213 | Windelmann | Apr. 7, 1925 |
| 2,193,624 | Garvey | Mar. 12, 1940 |
| 2,273,506 | Bachle | Feb. 17, 1942 |
| 2,280,484 | Gumlich | Apr. 21, 1942 |
| 2,304,549 | Dasher | Dec. 8, 1942 |
| 2,333,810 | Neal et al. | Nov. 9, 1943 |
| 2,325,289 | Treves | July 27, 1943 |
| 2,211,592 | Castello | Aug. 13, 1940 |

OTHER REFERENCES

"Institute of the Rubber Industry, Trans.," pp. 82–85, 1944.

"Industrial and Engineering Chem.," vol. 36, pp. 1114–1116 incl., 1944.

---

Certificate of Correction

Patent No. 2,415,449.  February 11, 1947.

EDWARD F. SVERDRUP ET AL.

It is hereby certified that error appears in the printed specification of the above numbered patent requiring correction as follows: Column 16, line 25, for "82–85" read *182–185*; and that the said Letters Patent should be read with this correction therein that the same may conform to the record of the case in the Patent Office.

Signed and sealed this 13th day of May, A. D. 1947.

[SEAL]

LESLIE FRAZER,
*First Assistant Commissioner of Patents.*